March 15, 1938. D. HOPPENSTAND 2,111,267
FASTENER
Filed Oct. 13, 1936
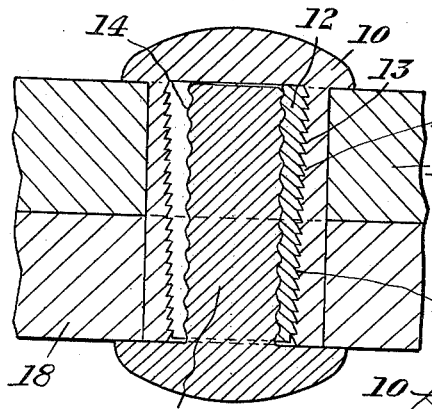
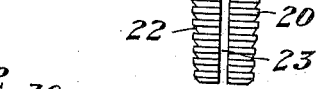
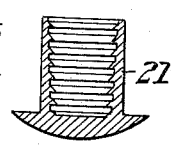
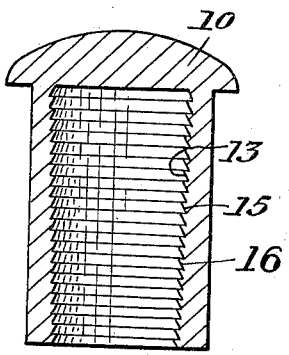
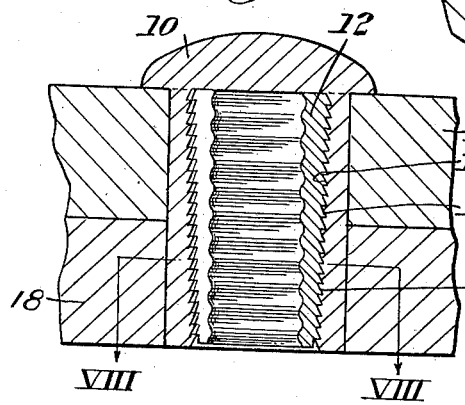
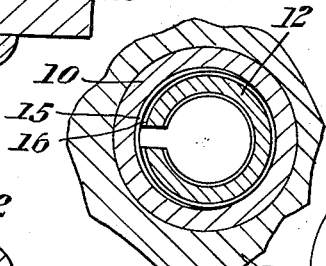
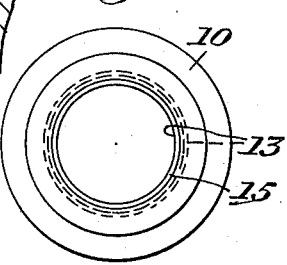
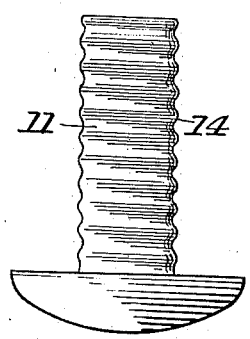
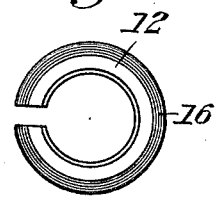
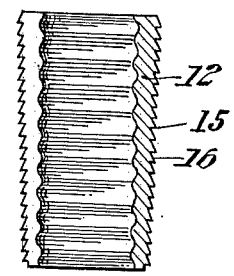
INVENTOR
David Hoppenstand
by his attorneys
Stebbins, Blenko & Parmelee Patented Mar. 15, 1938

2,111,267

UNITED STATES PATENT OFFICE 2,111,267

FASTENER

David Hoppenstand, Glenshaw, Pa., assignor to Hopkan Rivet Company, Inc., Pittsburgh, Pa., a corporation of Pennsylvania Application October 13, 1936, Serial No. 105,391

5 Claims. (Cl. 85—4)

This invention relates to a fastener, and in particular to a rivet or the like.

Rivets now used require upsetting to form a head, either hot or cold. I have invented a rivet which does not require any upsetting, and is thus a substantial improvement on rivets now available. In accordance with the invention, I provide two headed members, one in the form of a sleeve and the other in the form of a stud, with cooperating serrations of such character that when the two members are driven together, they are firmly held against separation. The details of the invention will be apparent from the following description which is to be taken in connection with the accompanying drawing, illustrating a preferred embodiment of the invention and a modification. In the drawing, Fig. 1 is a sectional view through a rivet in accordance with the invention, serving to secure two plates together;

Fig. 2 is a sectional view through the sleeve member of the rivet;

Fig. 3 is an end view of the sleeve;

Fig. 4 is a sectional view through a split expansible tube forming a part of one type of rivet;

Fig. 5 is an end view thereof;

Fig. 6 is an elevation of the stud member of one form of rivet;

Fig. 7 is a sectional view of the sleeve member with the expansible tube seated therein;

Fig. 8 is a sectional view along the line VIII—VIII of Fig. 7.

Fig. 9 is an elevation of a stud member of a different form of rivet;

Fig. 10 is a sectional view taken longitudinally through a sleeve member adapted to cooperate with the stud of Fig. 9; and Fig. 11 is a sectional view through a complete rivet composed of the stud and sleeve shown in Figs. 9 and 10.

Referring in detail to the drawing, one form of the invention comprises a headed sleeve 10, a headed stud 11, and a split expansible tube 12 therebetween. The sleeve 10 has a tapered bore 13. The tube 12 has an external taper corresponding to that of the bore of the sleeve, viz., about 3°. The bore through the tube 12 is corrugated, as at 14, and the stud 11 is correspondingly corrugated.

Shoulders or serrations 15 are formed in the bore in the sleeve 10, spaced axially thereof, and are connected by conical portions 16. The exterior surface of the tube 12 is provided with similar serrations or grooves.

When it is desired to employ the rivets shown in Figs. 1 through 8 as, for example, to secure together lapped plates 17 and 18 having alined holes therethrough, the sleeve member 10 is inserted through the holes in the plates and the tube 12 inserted in the bore in the sleeve member. The tube 12 being split, contracts slightly when forced into the bore in the sleeve member. For convenience, the tube 12 may be inserted in the sleeve member 10 before the latter is inserted through the holes in the plates 17 and 18, if desired. With the parts in the relative positions shown in Fig. 7, the stud 11 is driven into the bore of the tube 12. This may be accomplished by any means such as a conventional riveting hammer.

When the stud 11 is driven into the bore in the tube 12, it expands the latter and causes the shouldered grooves on the exterior surface thereof to engage cooperating grooves in the wall of the bore through the sleeve member 10. Such engagement firmly locks the parts in assembled relation, as shown in Fig. 1, and positively prevents any separation thereof.

The preferred form of the invention is shown in Figs. 9 through 11. As there shown, a rivet is composed of a headed stud 20 and a headed sleeve 21. The exterior of the stud 20 and the interior of the sleeve 21 are provided with serrations or grooves 22 similar to those shown at 16. The stud and sleeve, furthermore, are tapered slightly as shown. The stud has a longitudinal slot 23.

When it is desired to secure two members together by the aid of the rivet of my invention, either the stud or the sleeve is passed therethrough and the other member forcibly driven thereon, or therein, as the case may be. The slot 23 in the stud 20 permits the stud to contract slightly as it is driven into the bore in the sleeve 21, to permit the spaced shoulders of the stud to pass corresponding shoulders in the sleeve. When the stud has been driven home, the engagement of the cooperating shoulders or grooves securely holds the stud and sleeve together. While there may be some slight deformation of the edges of the shoulders or grooves, as the rivet is assembled this is not sufficient to prevent a secure anchorage of the two parts together.

It will be apparent from the foregoing description that the invention provides a highly improved means for securing elements together. No heating of the rivet is necessary, nor any cold deformation. The rivet may be easily applied with conventional tools, and can be manufactured at a cost comparable to that of ordinary rivets.

While I have illustrated and described herein but a preferred form of the invention and a modification thereof, it will be understood that changes in the details of the article disclosed may be made without exceeding the scope of the appended claims.

I claim:

1. A fastener comprising a tapered stud and a sleeve having a tapered bore, the stud and the bore of the sleeve having cooperating circumferential serrations permitting telescoping of the stud and sleeve and effective to hold the sleeve and stud against separation when once forced together.

2. A fastener comprising a sleeve and a stud adapted to be forced into the sleeve, said stud being tapered and said sleeve having a correspondingly tapered bore and cooperating projections and recesses in the bore of said sleeve and on said stud whereby the stud may be driven into the sleeve and is held against movement outwardly thereof.

3. A rivet comprising a tapered stud, and a sleeve having a tapered bore adapted to receive said stud, the surface of said stud and the interior of said bore having cooperating circumferential grooves and shoulders spaced axially thereof permitting telescoping of the stud and sleeve and preventing separation thereof.

4. A rivet comprising a sleeve having a tapered axial bore and a tapered stud, said stud and the bore in said sleeve having cooperating circumferential shoulders spaced axially thereof and connected by conical portions, whereby the stud may be driven into the sleeve but not withdrawn.

5. A rivet comprising a tapered stud and a sleeve having a tapered bore adapted to receive said stud, said stud and bore having cooperating circumferential grooves providing opposed shoulders permitting telescoping of the stud and sleeve yet effective to hold the stud and sleeve against separation.

DAVID HOPPENSTAND.